United States Patent
Wilhelm, Jr.

[19]

[11] Patent Number: 5,958,022
[45] Date of Patent: Sep. 28, 1999

[54] SYSTEM AND METHOD FOR I/O ACCESS MODE SELECTION

[75] Inventor: George William Wilhelm, Jr., Endwell, N.Y.

[73] Assignee: International Business Machines Corporation, Armonk, N.Y.

[21] Appl. No.: 08/828,189

[22] Filed: Mar. 21, 1997

[51] Int. Cl.$^6$ .............................. G06F 13/10; G06F 13/12
[52] U.S. Cl. ................................ 710/14; 710/10
[58] Field of Search ........................ 340/172.5; 395/800, 395/700, 500, 712, 872, 834; 710/10, 14

[56] References Cited

U.S. PATENT DOCUMENTS

| | | | |
|---|---|---|---|
| 5,265,252 | 11/1993 | Rawson et al. | 395/700 |
| 5,291,585 | 3/1994 | Sato et al. | 395/500 |
| 5,307,491 | 4/1994 | Feriozi et al. | 395/700 |
| 5,319,751 | 6/1994 | Garney | 395/200 |
| 5,359,713 | 10/1994 | Moran et al. | 395/200 |
| 5,404,494 | 4/1995 | Garney | 395/500 |
| 5,412,798 | 5/1995 | Garney | 395/500 |
| 5,430,845 | 7/1995 | Rimmer et al. | 395/275 |
| 5,701,491 | 12/1997 | Dunn et al. | 395/712 |

OTHER PUBLICATIONS

M.W. Dotson, et al "Switchable Mapping of I/O Card Registers Into I/O Or Memory Space", *IBM Technical Disclosure Bulletin (TDB)*, vol. 37, No. 01, Jan. 1994, pp. 317–318.

*Primary Examiner*—Thomas C. Lee
*Assistant Examiner*—Ilwoo Park
*Attorney, Agent, or Firm*—Shelley M Beckstrand

[57] ABSTRACT

A system and method for controlling the operation of an adapter operable in a plurality of modes, such as I/O mode and memory mapped mode. A generic adapter access routine is initialized with global data objects as pointers to corresponding sets of alternative adapter functions, and the adapter is initialized to function in a first mode and the pointers mapped to a corresponding current set of adapter functions. Device driver code calls to global data objects are executed by reference to the current set of adapter functions. Responsive to a request to switch modes, the adapter is switched to a second mode and the pointers remapped to a corresponding second set of adapter functions, and execution of device driver code calls to the global data objects continues.

6 Claims, 4 Drawing Sheets

SYSTEM AND METHOD FOR I/O ACCESS MODE SELECTION

BACKGROUND OF THE INVENTION

1. Technical Field of the Invention

This invention pertains to a system and method for controlling the operation of channel adapter. More particularly, it relates to a system and method for controlling operation of channel adapter adaptively in memory-mapped mode or I/O mode.

2. Background Art

Device drivers are programs or routines which control or manage the flow of data to and from I/O devices. The drivers form part of and interact with other portions of an operating system. An operating system normally includes a basic set of device drivers for I/O devices, such as a keyboard, fixed and floppy disks, display, and printer, commonly used in personal computers.

Because of minor differences in implementation of the IBM Micro Channel specification, for example, it is often the case that performance of a given Micro Channel adapter may be better when accessed as a memory device rather than when accessed as an I/O device using Intel IN and OUT instructions. For some systems, the converse is true. For example, some adapters perform better in a RISC System/6000 machine in I/O space while, in a Personal System/2 machine, memory-mapped access gives better performance.

In addition, certain types of operations may be more efficient in one mode, while other operations may be performed more efficiently in the other. For example, a given interconnection adapter when used in a given system may perform output operations more efficiently (faster and with less CPU use) in I/O mode while input operations are best performed in memory-mapped mode.

Consequently, there is a need for a system and method whereby the system configuration can be tailored for optimum performance, selecting memory-mapped mode when appropriate, or I/O mode when it would perform better, and also to change modes on-the-fly for certain types of applications.

M. W. Dotson, et al. teach a system for switchable mapping of I/O card registers into I/O space or memory space. See IBM Technical Disclosure Bulletin, Vol. 37 No. 1 January 1994, pp. 317–18, the teachings of which are incorporated herein by reference. Dotson et al teach that an adapter can be made that has either memory-mapped or I/O addressability.

Device driver design heretofore has been such that code is implemented according to the access type supported by the adapter, which is typically either memory-mapped or I/O. With an I/O card register switchable to I/O space or memory map mode, there is a need in the art for a software system and method that will most effectively utilize that capability by providing a device driver that can transparently support any access mode, choosing dynamically, or statically at system configuration time, which mode it will operate in, without modifying the software in order to accommodate the alternate mode.

It is an object of the invention to provide for optimum control of a bimodal I/O adapter.

It is a further object of the invention to provide a system and method for controlling the operation of a bimodal adapter in a manner substantially transparent to user code (except, in some applications, for the purpose of switching modes.)

It is a further object of the invention to provide a system and method whereby the system configuration can be tailored for optimum performance, selecting memory-mapped mode when appropriate, or I/O mode when it would perform better, and also to change modes on-the-fly for certain types of applications.

SUMMARY OF THE INVENTION

In accordance with this invention, a system and method is provided for controlling the operation of an adapter operable in a plurality of access modes. A generic adapter access routine is initialized with global data objects as pointers to corresponding sets of alternative adapter functions, and the adapter is initialized to function in a first mode and the pointers mapped to a corresponding current set of adapter functions. Other device driver code calls to global data objects are executed by reference to the current set of adapter functions. Responsive to a request to switch modes, the adapter is switched to a second mode and the pointers remapped to a corresponding second set of adapter functions, and execution of other device driver code calls to the global data objects continues.

Other features and advantages of this invention will become apparent from the following detailed description of the presently preferred embodiment of the invention, taken in conjunction with the accompanying drawings.

BEST MODE FOR CARRYING OUT THE INVENTION

In accordance with this invention, a system and method is provided whereby an application program can select the access mode (I/O or memory-mapped mode) of an adapter at run time. To do so, a set of hardware access routines and a switching mechanism for activating the desired mode are provided.

Figure 1:
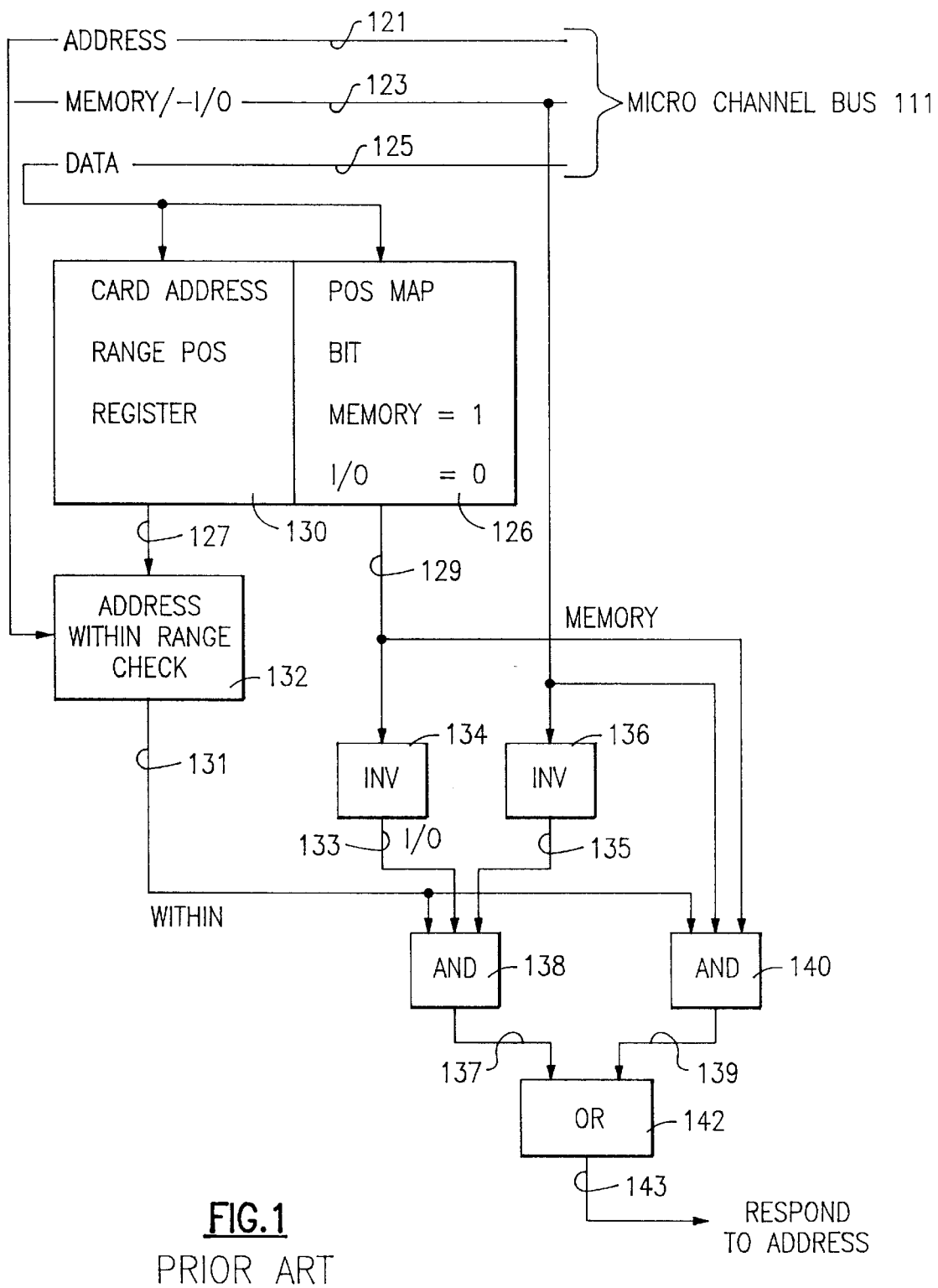
FIG. 1 illustrates a prior art adapter card.

Referring to FIG. 1, Dotson, et al, describes the Micro-Channel implementation of a prior art device driver. Data on data bus 125 is presented to card address register 130 including program option select (POS) map bit 126. Control line memory (not I/O) 123 is fed to inverter 136 and AND gate 140. Address bus 121 is fed to address within range check block 132. POS map bit 126 is fed on line 129 to inverter 134 and AND 140. Address within range check 132 receives as input address bus 121 and on line 127 the card address register 130 output. Address within range outline within 131 is fed to AND gates 138 and 140, the outputs of which are fed on lines 137, 139, respectively, to OR gate 142, the output of which appears on line 143.

In operation, card address range program option select (POS) register 130 is loaded from data bus 125 with the card address range, either memory or I/O address range, to which the card is to respond. POS register bit POS map bit 126 is loaded with the a bit defining whether the card is to respond as memory mapped or I/O mapped. As addresses are presented to the card channel 111, each individual address is checked to in block 132 to see if it is within the range of addresses defined by the card address range POS register 130. If it is, a further check is made in AND gate 140 to determine if the POS MAP bit 126 is programmed to respond to memory addresses and channel 111 is presenting a memory address, of in AND gate 138 if the POS MAP bit 126 is programmed to respond to I/O addresses and channel 111 is presenting an I/O address. If either case is true, the output of OR gate 142 is active, and the card responds to the address being presented. If not, the card ignores the address being presented.

Device drivers typically access a Micro Channel adapter by way of a set of routines designed to perform the desired low level input/output (I/O) operation. These routines may include 32-bit register reads and writes, and multi-word data moves for operations such as message transmission and receipt. Depending upon the adapter design, these routines access the adapter either using I/O instructions or as an extension of system memory with simple data moves to and from memory-mapped system addresses.

In accordance with this invention, in order to exploit the operation of an adapter such as that described in connection with FIG. 1, that supports both I/O and memory-mapped access, there are provided two sets of routines: one that provides I/O operations using IN and OUT; and one that provides memory-mapped operations. Further, in accordance with this invention, it is essential that the calling conventions be identical for both modes. For example, if Read32 is the memory-mapped function for reading a 32-bit register and In32 does the same thing in I/O mapped mode, then both Read32 and IN32 must return the same data type (a 32-bit datum) and take as input the same arguments (e.g., a register offset number of some size dictated by the adapter design.) These routines are not used directly by the device driver to access the hardware. Instead, an alias is used by the device driver for all adapter access. The calling convention of the alias function (though it is actually a pointer to a function) must also match that of the I/O and memory-mapped access routines.

Referring to Table 1, C language declarations for selected alias pointer and access functions are set forth. In Table 1, the alias is listed first, followed by the pair of access functions: memory-mapped, and I/O respectively.

TABLE 1

ALIAS DECLARATIONS

| | |
|---|---|
| ULONG | (*ReadRegister)( USHORT register_offset ); |
| ULONG | Read 32( USHORT register_offset ); |
| ULONG | In32( USHORT register_offset ); |
| void | (*WriteRegister)( ULONG 32_bit_data, USHORT register_offset ); |
| void | Write32( ULONG 32_bit_data, USHORT register_offset ); |
| void | Out 32( ULONG 32_bit_data, USHORT register_offset ); |
| void | (*ReadMultiple)( ULONG *target_address, USHORT register_offset ); |
| void | ReadMany( ULONG *target_address, USHORT register_offset ); |
| void | InMany( ULONG *target_address, USHORT register_offset ); |
| void | (*WriteMultiple)( ULONG *source_address, USHORT register_offset ); |
| void | WriteMany( ULONG *source_address, USHORT register_offset ); |
| void | OutMany( ULONG *source_address, USHORT register_offset ); |

In accordance with one exemplary implementation of the invention, the device driver accesses 32-bit registers via functions ReadRegister and WriteRegister. These functions are really aliases for the actual access routines which are:

In32 and Out32 in I/O mode, and Read32 and Write32 in memory-mapped mode.

At initialization of the device driver, the default mode is selected, perhaps I/O mode. In this case, the alias pointers ReadRegister and WriteRegister are set equal to the In32 and Out32 functions, respectively. Thereafter, when the device driver accesses an adapter register via the ReadRegister and Write Register alias functions, it is actually using the In32 and Out32 routines without being aware of it. In order to access the adapter in a different mode, the mode must be switched.

For systems or applications which can realize a performance enhancement by operating in a mode other than the default, a switching mechanism is added to the device driver. This mechanism, in one embodiment, takes the form of a pair of simple ioctl calls: SET_MEMORY_MAP_MODE, and SET_IO_MAP_MODE. Accessing one of these ioctl functions causes the device driver to:
1. Temporarily mask interrupt processing to prevent interference with the switching operation;
2. Program the adapter hardware register that causes it to recognize the desire alternate mode;
3. Set the various alias functions (e.g., ReadRegister and WriteRegister) equal to the actual access routines for the desired mode; and
4. Reenable interrupt processing to allow normal operation to continue.

Upon completion of this sequence, the device driver and adapter now operate in the alternate mode of hardware access. Hidden by alias routines, the device driver is, as before, unaware of what operational mode the adapter is actually in.

Figure 2:
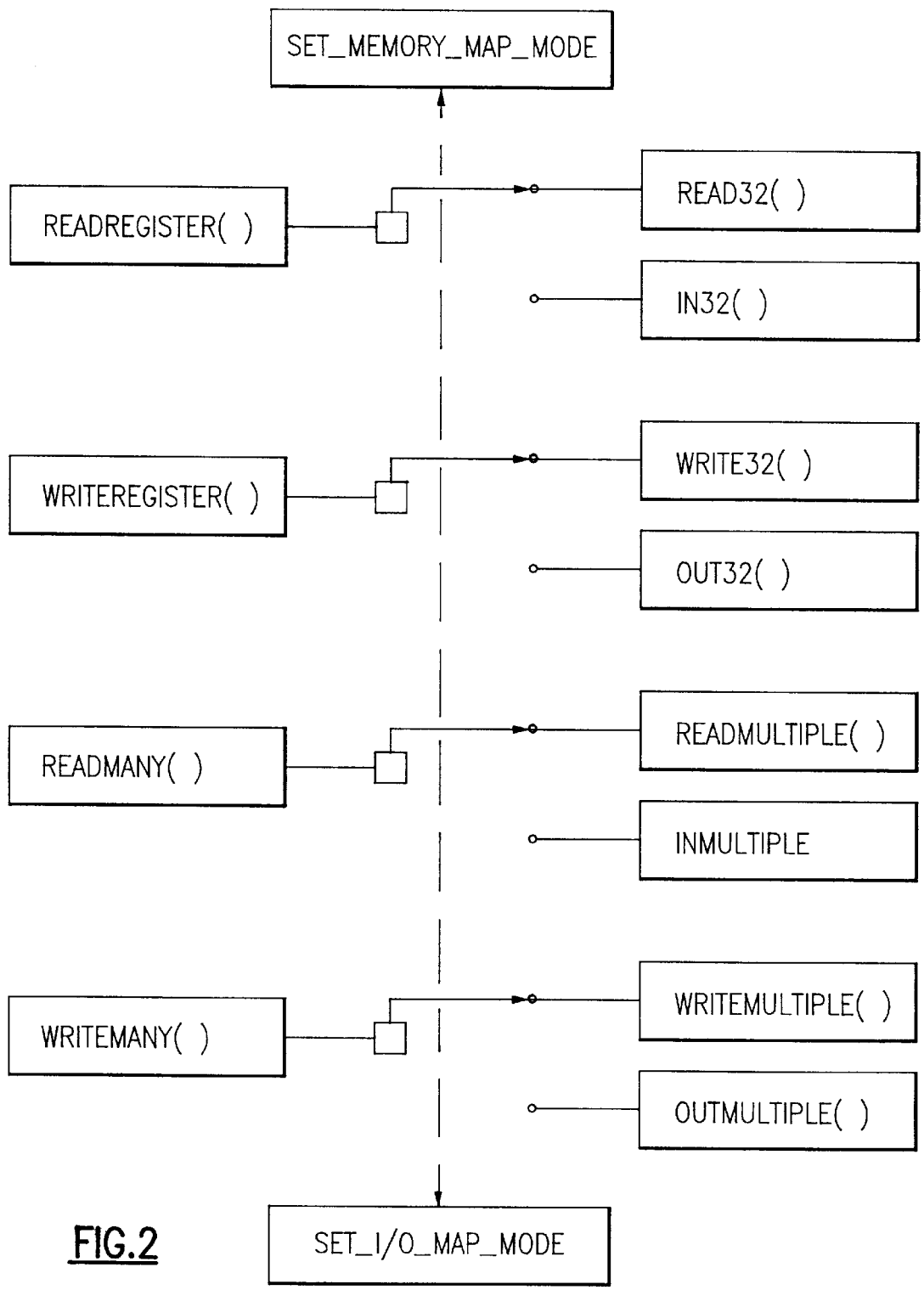
FIG. 2 is diagram illustrating the method of the invention for switching adapter access mode.

Referring to FIG. 2, the switching mechanism of the invention is illustrated. Throwing the switch towards the MEMORY_MAP_MODE connects the alias pointers to the memory-mapped routines; throwing the switch the other way connects them to the I/O routines instead.

This switching operation can be performed by the application program that uses the target hardware, or by the system itself based upon preset configuration data and knowledge of the benefits of operating in one mode or another for a given system type.

While most adapters do not provide the capability to operate in either mode, for those that do (such as the adapter described in M. W. Dotson, et al., supra), this technique is a means of tuning system operation and extracting additional performance gains.

Figure 3:
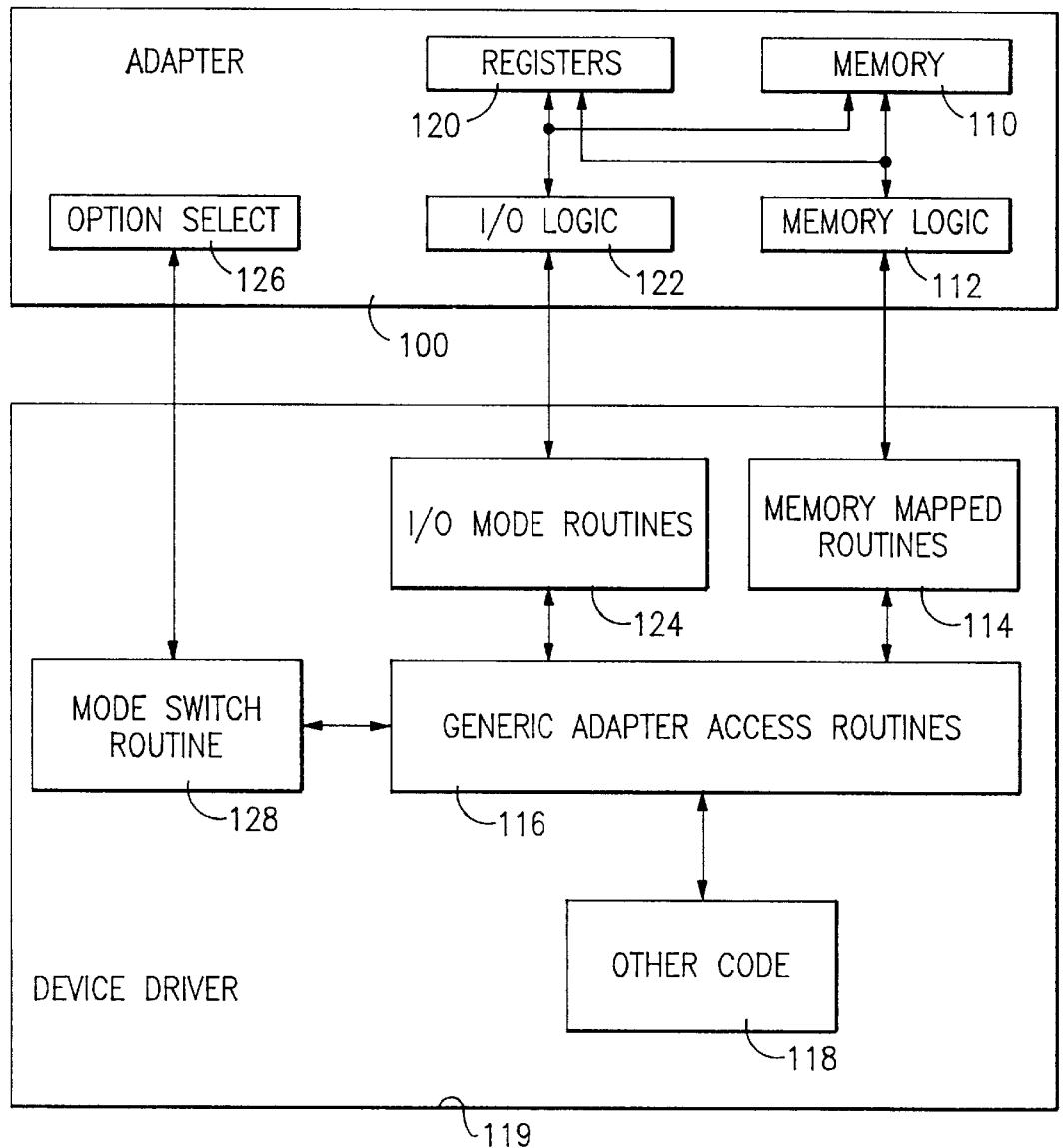
FIG. 3 is a system diagram illustrating the system of the invention for controlling a bi-modal adapter card.

Referring to FIG. 3, adapter 100 is connected to a computer and provides some function for that computer. Adapter 100 has registers 120 and memory 110 which are used to control its operation. Adapter 100 is responsive to accesses in one of two modes. It has I/O logic 122 which is responsive to In and Out (I/O cycles) instructions for accessing the internal registers 120 and memory 110 of adapter 100, and it has memory mapped logic 112 which is responsive to memory cycles for accessing the same registers 120 and memory 110. Which mode adapter 100 responds to is controlled by option select register 126.

In accordance with this invention, device driver code 119 includes I/O mode routines 124 and memory mapped routines 114 implemented to provide fundamental operations for accessing adapter 100 regardless of the mode it is in. These included read an adapter register 120, write an adapter register 120, copy data to adapter memory 110, read data from adapter memory 110, and so forth. These routines are implemented with identical calling conventions. That is, the parameter passed in to the routines 114, 124 are identical, as also are the results received from them.

A set of generic adapter access routines 116 are implemented as pointers to functions that point either to the set of I/O routines 124 or memory mapped routines 114. Other code 118 then uses only the generic access routines 116 to perform operations to adapter 100. As such, the exact set of routines, I/O 124 or Memory mapped 114, which are in use are unknown to other code 118.

A mode switch routine 128 is implemented that can change the access mode of adapter 100 by writing to option selection register 126. When the access mode is changed in this manner, mode switch routine 128 also updates the generic adapter access routine 116 pointers to point to the corresponding I/O mode routines 124 or memory mapped routines 114.

Normally, the operational mode is set based on some a priori assumption about system behavior (for example, that adapter 100 in a particular system is primarily sending data, or perhaps primarily receiving data). However, in accordance with an alternative embodiment of the invention, the access mode is changed dynamically in response to changing conditions to use the most efficient set of access routines, thereby maximizing performance.

Figure 4:
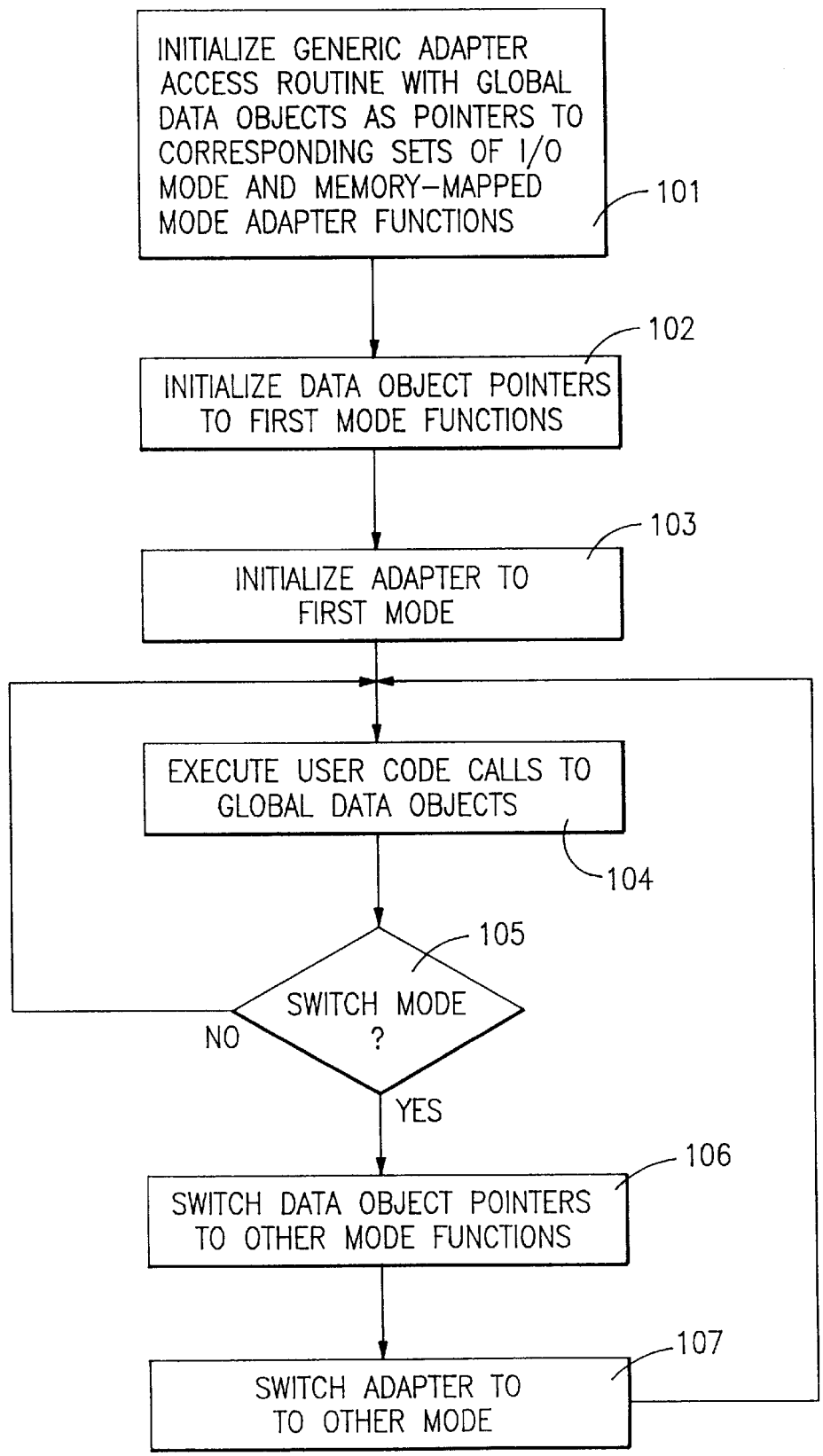
FIG. 4 is a flow diagram of the method of the invention for controlling a bi-modal adapter card.

Referring to FIG. 4 in connection with Tables 2 through 6, a preferred embodiment of the method of the invention is set forth.

In step 101, generic adapter access routine 116 is initialized as data object pointers to corresponding sets of I/O mode adapter functions or routines 124 and memory mapped functions 114. In steps 102 and 103, the data object pointers 116 and adapter 100 are initialized to a first mode, either I/O mode 124, 122 or memory mapped mode 114, 112. In step 104, other device driver code 118 for the same device driver 119 calls to global data objects are executed with reference to the selected mode functions. Thus, in Table 2, global data objects are declared as pointers to functions, and a procedure in device driver code 118 calls the function pointed to by these pointers by using the name of one of these objects as though it were the name of a function. Thus, ReadReg(0× 5c); will return the value in register number 92 using whichever routine that the ReadReg variable points to. These variables, set in the embodiment of Table 2 to zero (0), or memory mapped mode, may also be initialized to I/O mode by setting them equal to one (1).

TABLE 2

ADAPTER ACCESS ROUTINE FUNCTION POINTERS

```
/*
 *    Global cover functions for bi-modal adapter 100
 *       register/FIFO access routines.
 */
ULONG    (__fastcall *ReadReg) (USHORT OFFSET)
            = In32;
void     (__fastcall *WriteReg) (ULONG data, USHORT offset)
            = Out32;
void     (*ReadMsg) (void far *target, USHORT count)
            = InF0;
void     (*WriteMsg) (void far *source, USHORT count)
            = OutF0;
void     (__fastcall *ReadLinMsg) (ULONG target, USHORT count)
            = InLinF0;
void     (__fastcall *WriteLinMsg) (ULONG source, USHORT count)
            = OutLinF0;
void     (*Eject) (USHORT count)
            = EjectIn;
```

In step 105, a determination is made as to whether or not the adapter mode should be changed. If so, processing is disabled, in steps 106 and 107 the data object pointers are set to the alternative mode functions (from I/O mode 124 to memory mapped mode 114, or visa versa, as the case may be) and adapter 100 option select 126 is switched to enable I/O mode logic 122 to that of memory mapped logic 112, or visa versa.)

In Table 3, the procedure for switching between modes is set forth. ReadReg, WriteReg, ReadMsg, WriteMsg, ReadLinMsg, WriteLinMsg, and Eject are the global functions pointers from Table 2. Read32, Write32, ReadF0, WriteF0, readLinF0, WriteLinF0 and EjectRead are the actual routines, respectively, that perform adapter access when in memory map mode. In32, Out32, InF0, OutF0, InLinF0, OutLinF0, and EjectIn, respectively, are the actual routines that perform adapter access when in I/O mode.

TABLE 3

PROCEDURE TO SWITCH BETWEEN MODES
(PART A)

```
/*
 *   set_access-mode()
 *
 *   This routine is used to set the access mode to the
 *   adapter 100 to either memory-mapped mode or I/O-
 *   mapped mode. This routine programs the POS register
 *   bit for the correct access method and updates the
 *   access routine pointers to either the memory-mapped
 *   or I/O-mapped routines.
 */
    void set_access_mode
    (
    UCHAR mode
    )
{
    _disable();                              /* no interruptions please */
    if (mode -- MEMORY_MAP_MODE) {
        ReadReg       = Read32;              /* update access routine */
        WriteReg      = Write32;             /* pointers */
        ReadMsg       = ReadF0;
        WriteMsg      = WriteF0;
        ReadLinMsg    = ReadLinF0;
        WriteLinMsg   = WriteLinF0;
        Eject         = EjectRead;
```

TABLE 3

PROCEDURE TO SWITCH BETWEEN MODES
(PART B)

```
/*  Now that the pointers are switched, switch
 *  the mode at the card back to memory map
 *  mode.
 */
    outPOS( acb.slot, 0x104, acb.pos[4] | MEMORY_MAP_MODE
              );
}
else {
        ReadReg       = In32;                /* update access routine */
        WriteReg      = Out32;               /* pointers */
        ReadMsg       = InF0;
        WriteMsg      = OutF0;
        ReadLinMsg    = InLinF0;
        WriteLinMsg   = OutLinF0;
        Eject         = EjectIn;
/*
 *  Now that the pointers are switched, switch
 *  the mode at the card
 */
    OutPOS (acb.slot, 0x104, acb.pos[4] & IO_MAP_MODE_MASK
              ):
}
_enable();                                   /* not really needed since */
                                             /* OutPOS re-enables */
return;
}                                            /* end set_access_mode() */
```

In Table 4, sample access routines are set forth for memory-map mode. This routine reads multiple data words (given by a count) from the adapter FIFO using memory mapped data transfers.

TABLE 4

SAMPLE ACCESS ROUTINE IN MEMORY-MAP MODE

```
;
;    void ReadF0( void far *target,USHORT count );
;
_ReadF0  proc     near
         push     bp              ; set up a stack frame
         mov      bp,sp
         push     es              ; save the seg regs
         push     ds              ;
         push     di              ; and the C regs we use
         push     si              ;
         les      di,[bp+4]       ; target buffer must be ES:DI
         lds      si, dword ptr _smu_mem
                                  ; source buffer is DS:SI
         add      si, 00f0h       ; source offset to msg FIFO
         mov      cx,[bp+8]       ; loop count in CX
         rep      movsd           ; just do it
         pop      si              ; restore the C regs
         pop      di              ;
         pop      ds              ; and the seg regs we used
         pop      es              ;
         pop      bp              ; restore stack frame and . . .
         ret                      ; return
_ReadF0  endp
```

Referring to Table 5, a sample access routine in I/O mode is set forth—for the alternate, or peer, function to that set forth in Table 4, ReadF0. It reads multiple data words (given by a count) from the adapter FIFO using memory mapped data transfers.

TABLE 5

SAMPLE ACCESS ROUTINE IN I/O MODE

```
;
;    void InF0( void far *target, ushort count );
;
_InF0    proc     near
         push     bp              ; set up a stack frame
         mov      bp,sp
         push     es              ; save the seg regs we use
         push     di              ;
         les      di,[bp+4]       ; target buffer must be ES:DI
         mov      cx,[bp+8]       ; loop count in CX
         mov      dx,            ; base I/O port address in DX
                  _smu_io
         add      dx, 00f0h      ; offset to IMMEDI-
                                  ATE_MESSAGE
                                  ; register
         rep      insd            ; just do it
         pop      di              ; restore the 'C' regs we used
         pop      es              ;
         pop      bp              ; restore stack frame and . . .
         ret                      ; return
_InF0    endp
```

TABLE 6

CODE SAMPLE FOR CALLING THE PROPER ACCESS ROUTINE

```
/*
 *   Read the message words from the adapter FIFO.
 */
    ReadMsg( (void far *) target_buffer, number_of_fifo_words );
```

ADVANTAGES OVER THE PRIOR ART

The advantages of the preferred embodiments of the invention include exploiting an adapter that supports both memory mapped or I/O space access by adaptive software that uses the most appropriate access mode to maximize performance.

It is a further advantage of the invention that it provides a method and system for run-time switching of a dual access mode adapter, thus optimizing performance for a given set of system characteristics. An adapter may be able to sustain a higher data input while in memory-mapped mode, and perform output more efficiently when in I/O mode. Thus, a system composed of subsets of nodes that are primarily in receive or send mode can be tuned for optimum throughput and minimum CPU utilization.

It is a further advantage of the invention that, except for code that switches the mode, transparent use of an adapter operable in either memory mapped or I/O space access mode is made by software using entry point pointer switching for access routines.

It is a further advantage of the invention that it provides a system and method for an application controlled optimization interface.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

I claim:

1. A method for use of an adapter operable in a plurality of modes to optimize adapter performance characteristics, comprising the steps of initializing a generic adapter access routine with global data objects as pointers to corresponding sets of alternative adapter functions;

initializing said adapter to function in a first mode and to map said pointers to a corresponding current set of adapter functions;

executing other code calls to global data objects by reference to said current set of adapter functions;

responsive to a request to switch modes to optimize adapter performance, dynamically switching said adapter to a second mode and remapping said pointers to a corresponding second set of adapter functions.

2. The method of claim 1 wherein said adapter is selectively operable in memory-mapped mode or I/O mode.

3. The method of claim 2 wherein said global data objects include ReadReg, WriteReg, ReadMsg, WriteMsg, ReadLinMsg, WriteLinMsg, and Eject; corresponding I/O mode functions are In32, Out32, InF0, OutF0, InLinF0, OutLinF0, and EjectIn, respectively; and corresponding memory-mapped mode functions are Read32, Write32, ReadF0, WriteF0, readLinF0, WriteLinF0 and EjectRead, respectively.

4. Adapter apparatus operable selectively in I/O mode or memory mapped mode, the apparatus including a register set, a memory, I/O logic, memory logic, and an option select register for selectively enabling said I/O logic or said memory logic, the improvement comprising:

an I/O mode code routine for executing I/O mode functions;

a memory mapped code routine for executing memory mode functions;

a generic adapter access code routine for mapping a set of global data objects to said I/O mode functions and said memory mode functions;

a mode switch routine for optimizing performance of said adapter apparatus by selectively statically and dynamically enabling mapping of said of global data objects to one of said I/O mode functions and said memory mode functions and said option select register to enable the corresponding I/O logic or memory logic; and other device driver code routine for issuing calls to said global data objects.

5. A memory device for storing signals for controlling the operation of a computer channel adapter according to the method for optimizing adapter performance characteristics comprising the steps of initializing a generic adapter access routine with global data objects as pointers to corresponding sets of alternative adapter functions;

initializing said channel adapter to function in a first mode and to map said pointers to a corresponding current set of adapter functions;

executing other device driver code calls to global data objects by reference to said current set of adapter functions;

responsive to a request to switch modes to optimize adapter performance, dynamically switching said channel adapter to a second mode and remapping said pointers to a corresponding second set of adapter functions.

6. A memory device for storing signals for structuring a digital computer to interface an adapter, said adapter including a register set, a memory, I/O logic, memory logic, and an option select register for selectively enabling said I/O logic or said memory logic, said computer comprising:

an I/O mode code routine for executing I/O mode functions;

a memory mapped code routine for executing memory mode functions;

a generic adapter access code routine for mapping a set of global data objects to said I/O mode functions and said memory mode functions;

a mode switch routine for optimizing performance of said adapter by selectively statically and dynamically enabling mapping of said of global data objects to one of said I/O mode functions and said memory mode functions and said option select register to enable the corresponding I/O logic or memory logic; and a device driver code routine for issuing calls to said global data objects for accessing said adapter.

* * * * *